(12) United States Patent
Shih (10) Patent No.: US 11,901,808 B2
(45) Date of Patent: Feb. 13, 2024

(54) METHOD FOR PROTECTING CIRCUIT AND ELECTRONIC DEVICE

(71) Applicant: InnoLux Corporation, Miao-Li County (TW)

(72) Inventor: Ching-Wen Shih, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 163 days.

(21) Appl. No.: 17/705,787

(22) Filed: Mar. 28, 2022

(65) Prior Publication Data

US 2022/0352811 A1     Nov. 3, 2022

(30) Foreign Application Priority Data

Apr. 28, 2021  (CN) .......................... 202110465787.9

(51) Int. Cl.
*H02M 1/32*     (2007.01)
*H02H 3/20*     (2006.01)
*H02M 3/155*    (2006.01)
*H02M 1/36*     (2007.01)

(52) U.S. Cl.
CPC .............. *H02M 1/32* (2013.01); *H02H 3/207* (2013.01); *H02M 3/155* (2013.01); *H02M 1/36* (2013.01)

(58) Field of Classification Search
CPC . H02M 1/36; H02M 1/32; H02M 3/155–1588
See application file for complete search history.

(56) References Cited

U.S. PATENT DOCUMENTS

| 2014/0152287 A1* | 6/2014 | Weng ...................... H02M 1/36 323/311 |
| 2014/0253072 A1* | 9/2014 | Hussien .................. H02M 1/36 323/288 |
| 2019/0089246 A1* | 3/2019 | Santhosh ............... H02M 3/157 |

FOREIGN PATENT DOCUMENTS

TW          I446670 B      7/2014

* cited by examiner

*Primary Examiner* — Peter M Novak
(74) *Attorney, Agent, or Firm* — Muncy, Geissler, Olds & Lowe, P.C.

(57) ABSTRACT

A method for protecting a circuit includes steps of: providing a first current source connected to a capacitor of the circuit through a second switch; providing a detection and control unit for turning on the second switch at a first time, and let the first current source to charge the capacitor; detecting a voltage value of the capacitor by the detection and control unit; wherein when the voltage value is greater than or equal to a reference voltage value, the detection and control unit turns off the second switch and turns on a first switch of the circuit, and when the voltage value is lower than the reference voltage value, the detection and control unit turns off the second switch and continue turns off the first switch.

19 Claims, 6 Drawing Sheets

METHOD FOR PROTECTING CIRCUIT AND ELECTRONIC DEVICE

CROSS REFERENCE TO RELATED APPLICATION

This application claims the benefits of the Chinese Patent Application Serial Number 202110465787.9, filed on Apr. 28, 2021, the subject matter of which is incorporated herein by reference.

BACKGROUND

1. Field of the Disclosure

The present disclosure relates to a method for protecting a circuit and an electronic device and, more particularly, to a method for protecting a step-up circuit or a step-down circuit and an electronic device.

2. Description of Related Art

At present, the electronic device is typically equipped with a step-up circuit or a step-down circuit to provide the voltage required for the operation of the electronic device, and a switch is provided between the input end and/or the output end of the step-up circuit or the step-down circuit, so that, when the switch is turned on, the step-up circuit or the step-down circuit starts to operate.

In general, the step-up circuit or the step-down circuit is electrically connected to a chip, and the switch is controlled by the chip. However, when a short-circuit condition occurs and a large current flows directly into the short-circuited portion, even if the chip can detect the occurrence of a short-circuit, the chip cannot immediately turn off the switch and thus the large current may cause damage to the components in the step-up circuit or the step-down circuit resulting in affecting the performance of the electronic device.

Therefore, there is a need for a method for protecting a circuit, and an electronic device to mitigate or obviate the aforementioned problems.

SUMMARY

The present disclosure provides a method for protecting a circuit. The circuit includes an input end, a first switch, and a capacitor electrically connected to the input end through the first switch. The method includes: providing a first current source electrically connected to the capacitor through a second switch; providing a detection and control unit to turn on the second switch at a first time point so as to enable the first current source to charge the capacitor; and using the detection and control unit to detect a stored voltage value of the capacitor at a second time point, and compare the stored voltage value with a reference voltage value, wherein, when the stored voltage value is greater than or equal to the reference voltage value, the detection and control unit turns off the second switch and turns on the first switch and, when the stored voltage value is smaller than the reference voltage value, the detection and control unit turns off the second switch and keeps the first switch off.

The present disclosure further provides an electronic device, which includes a circuit and a circuit protection device. The circuit includes an input end, a first switch and a capacitor, wherein the capacitor is electrically connected to the input end through the first switch. The circuit protection device includes a second switch, a first current source, and a detection and control unit, wherein the first current source is electrically connected to the capacitor through the second switch, and the detection and control unit turns on the second switch at a first time point so that the first current source charges the capacitor, detects a stored voltage value of the capacitor at a second time point, and compares the stored voltage value with a reference voltage value, wherein, when the storage voltage value is greater than or equal to the reference voltage value, the detection and control unit turns off the second switch and turns on the first switch and, when the stored voltage value is smaller than the reference voltage value, the detection and control unit turns off the second switch and keeps the first switch off.

Other novel features of the disclosure will become more apparent from the following detailed description when taken in conjunction with the accompanying drawings.

DETAILED DESCRIPTION OF EMBODIMENT

The implementation of the present disclosure is illustrated by specific embodiments to enable persons skilled in the art to easily understand the other advantages and effects of the present disclosure by referring to the disclosure contained therein. The present disclosure is implemented or applied by other different, specific embodiments. Various modifications and changes can be made in accordance with different viewpoints and applications to details disclosed herein without departing from the spirit of the present disclosure.

It should be noted that, in the specification and claims, unless otherwise specified, having "one" element is not limited to having a single said element, but one or more said elements may be provided.

In addition, in the specification and claims, unless otherwise specified, ordinal numbers, such as "first" and "second", used herein are intended to distinguish components rather than disclose explicitly or implicitly that names of the components bear the wording of the ordinal numbers. The ordinal numbers do not imply what order a component and another component are in terms of space, time or steps of a manufacturing method.

In addition, the term "adjacent" used in the specification and claims may refer to describe mutual proximity and does not necessarily mean mutual contact.

In addition, the description of "when . . . " or "while . . . " in the present disclosure means "now, before, or after", etc., and is not limited to occurrence at the same time. In the present disclosure, the similar description of "disposed on" or the like refers to the corresponding positional relationship between the two components, and does not limit whether there is contact between the two components, unless specifically limited. Furthermore, when the present disclosure recites multiple effects, if the word "or" is used between the effects, it means that the effects can exist independently, but it does not exclude that multiple effects can exist at the same time.

In addition, the terms "connect" or "couple" in the specification and claims not only refer to direct connection with another component, but also indirect connection with another component, or refer to electrical connection. Besides, the electrical connection may include a direct connection, an indirect connection, or a mode in which two components communicate through radio signals In addition, in the specification and claims, the term "almost", "about", "approximately" or "substantially" usually means within 20%, 10%, 5%, 3%, 2%, 1% or 0.5% of a given value or range. The quantity the given value is an approximate quantity, which means that the meaning of "almost", "about", "approximately" or "substantially" may still be implied in the absence of a specific description of "almost", "about", "approximately" or "substantially". In addition, the terms "ranging from the first value to the second value" and "range between the first value to the second value" indicate that the range includes the first value, the second value, and other values between the first value and the second value.

In addition, each component may be implemented as a single circuit or an integrated circuit in a suitable manner, and may include one or more active components, such as transistors or logic gates, or one or more passive components, such as resistor, capacitor or inductor, but not limited thereto. The components may be connected to each other in a suitable manner, for example, respectively matching the input signal and the output signal, and using one or more lines to form a series or parallel connection. Besides, each component may allow input and output signals to enter and exit sequentially or in parallel. The aforementioned configurations are determined according to the actual application.

In addition, in this disclosure, the term such as "system", "apparatus", "device", "module" or "unit" refers to an electronic component or a digital circuit composed of multiple electronic components, an analog circuit, or other more generalized circuits, and unless otherwise specified, they do not necessarily have a hierarchical relationship.

In addition, the technical features of the different embodiments disclosed in this disclosure may be split or combined to form another embodiment.

In addition, the electronic device disclosed in the present disclosure may include a display device, an antenna device, a sensing device, a touch display device, a curved display device, or a free shape display device, but is not limited thereto. The electronic device may be a bendable or flexible electronic device. The electronic device may include, for example, liquid crystal, light emitting diode, fluorescence, phosphor, other suitable display media, or a combination thereof, but is not limited thereto. The light emitting diode may include, for example, an organic light emitting diode (OLED), a sub-millimeter light emitting diode (mini LED), a micro light emitting diode (micro LED) or a quantum dot (QD) light emitting diode (for example, QLED, QDLED) or other suitable materials or a combination thereof, but is not limited thereto. The display device may include, for example, a tiled display device, but is not limited thereto. The antenna device may be, for example, a liquid crystal antenna, but is not limited thereto. The antenna device may include, for example, a tiled antenna device, but is not limited thereto. It should be noted that the electronic device may be a combination of the foregoing, but is not limited thereto. In addition, the appearance of the electronic device may be rectangular, circular, polygonal, a shape with curved edges, or other suitable shapes. The electronic device may have peripheral systems such as a driving system, a control system, a light source system, a shelf system, etc., to support a display device, an antenna device, or a tiled device. Hereinafter, the display device will be used as an electronic device for illustrative purpose only, but the disclosure is not limited thereto.

Figure 1:
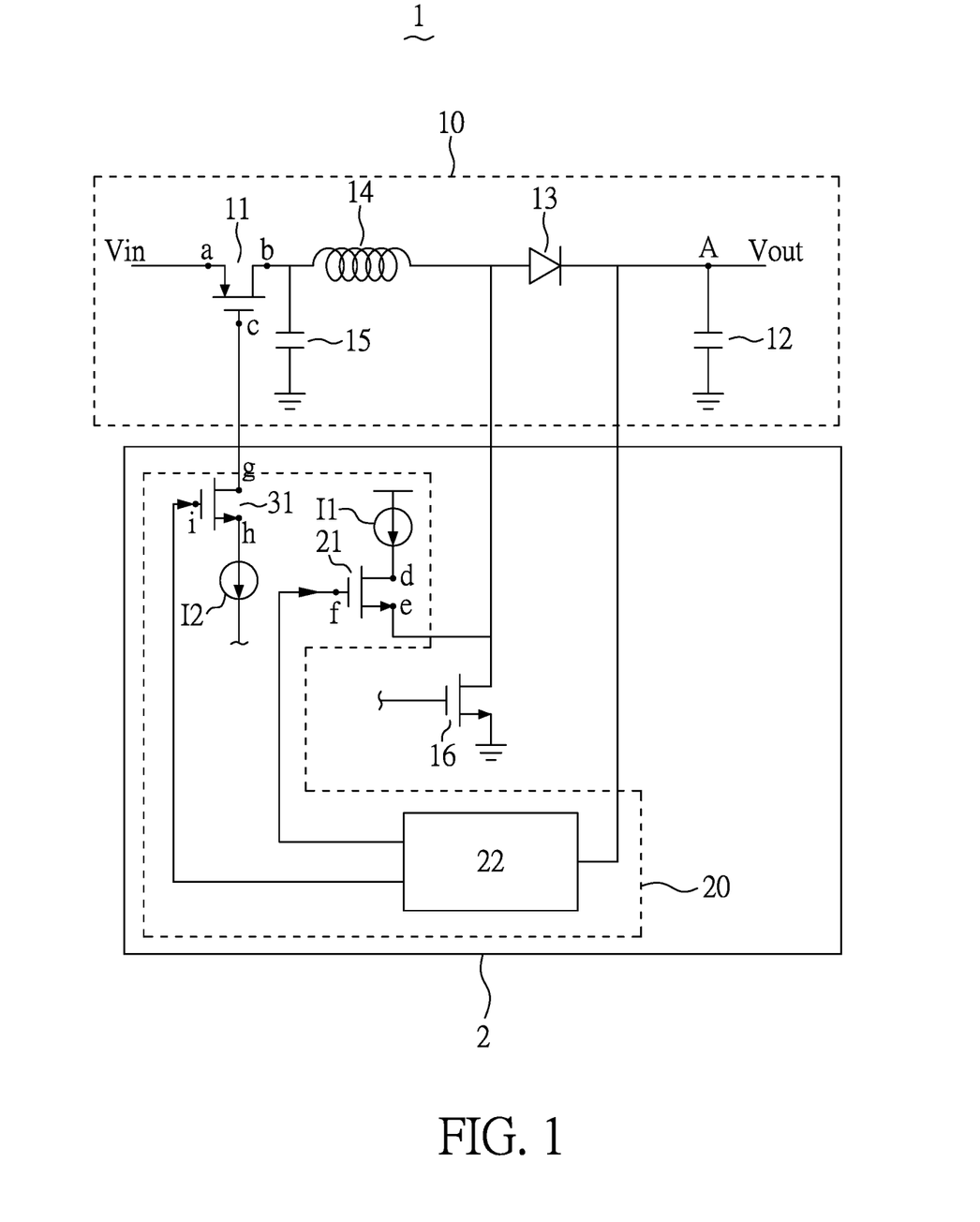
FIG. 1 is a schematic diagram of the electronic device according to an embodiment of the present disclosure.

FIG. 1 is a schematic diagram of the electronic device 1 according to an embodiment of the present disclosure. As shown in FIG. 1, the electronic device 1 at least includes a circuit 10 and a chip 2, wherein the chip 2 includes a circuit protection device 20. In addition, the circuit 10 may include a plurality of components, wherein some of the components in the circuit 10 may be disposed in the chip 2, but are not limited thereto. The circuit 10 includes an input end Vin, a first switch 11, a capacitor 12 and an output end Vout. The input end Vin may receive signal from an external voltage source, and the capacitor 12 is electrically connected to the input end Vin through the first switch 11. The circuit protection device 20 includes a first current source I1, a second switch 21, and a detection and control unit 22, wherein the first current source I1 is electrically connected to the capacitor 12 through the second switch 21. When the electronic device 1 is just started, the first switch 11 is in a turn-off state, and thus the signal from the external voltage source does not flow into the components in the circuit 10. In addition, the electronic device 1 may include a third switch 16, wherein the third switch 16 may be disposed inside the chip 2, but may also be disposed outside the chip 2, for example, disposed in the circuit 10. The present disclosure is not limited thereto. In addition, the circuit protection device 20 may include a fourth switch 31 and a second current source 12, wherein the fourth switch 31 may be electrically connected to the first switch 11, and the detection and control unit 22 may control the fourth switch 31.

Figure 2A:
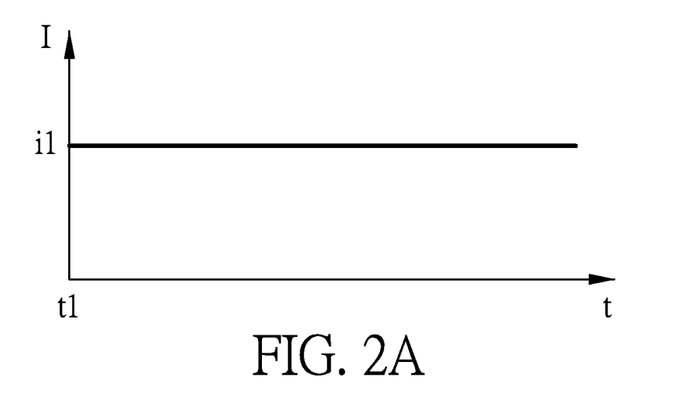
FIG. 2A is a signal timing diagram of the first current of the first current source according to an embodiment of the present disclosure.
Figure 2B:
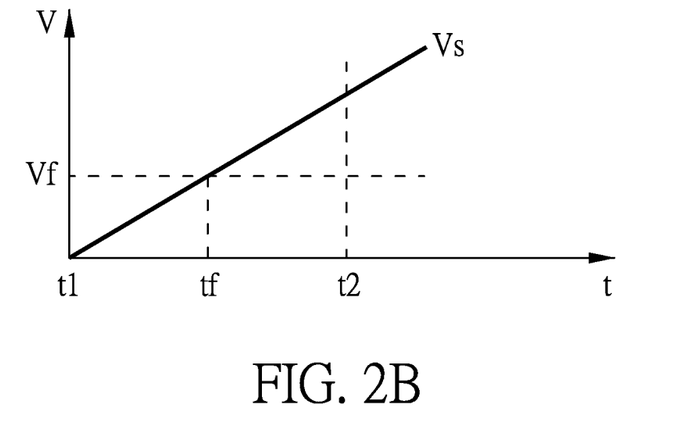
FIG. 2B is a signal timing diagram of the stored voltage value according to an embodiment of the present disclosure.
Figure 2C:
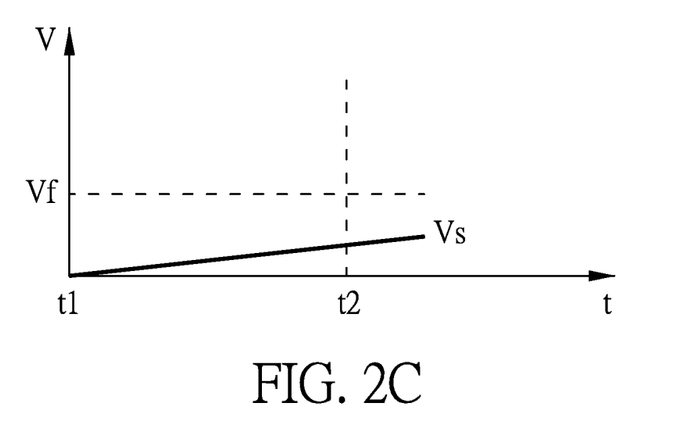
FIG. 2C is a signal timing diagram of the stored voltage value according to an embodiment of the present disclosure (when the capacitor is short-circuited)

Please refer to FIGS. 2A to 2C in combination with FIG. 1, wherein FIG. 2A is a signal timing diagram of the first current i1 provided by the first current source I1 according to an embodiment of the present disclosure, FIG. 2B is a signal timing diagram of a stored voltage value Vs of a capacitor 12 according to an embodiment of the present disclosure, and FIG. 2C is a signal timing diagram of the stored voltage value Vs according to another embodiment of the present disclosure (when the circuit is short-circuited). The first current source I1 may output a first current i1 (in amperes, A), and the detection and control unit 22 may turn on the second switch 21 at a first time point t1. At this moment, the capacitor 12 may be charged by the first current source I1. In addition, the detection and control unit 22 may detect the stored voltage value Vs (in volts, V) of the capacitor 12 at a second time point t2, and compare the stored voltage value Vs with a reference voltage value Vf (in volts, V). In one embodiment, the second time point t2 may be later than the first time point t1. In addition, when the stored voltage value Vs is greater than or equal to the reference voltage value Vf (Vs≥Vf), the detection and control unit 22 may turn off the second switch 21 and turn on the fourth switch 31 so as to turn on the first switch 11 and, at this moment, a current may flow through the circuit 10. When the stored voltage value Vs is smaller than the reference voltage value Vf (Vs<Vf), the detection and control unit may turn off the second switch 21, and keep the fourth switch 31 off to continuously turn off the first switch 11, so that the current from the external voltage source cannot flow through the circuit 10, thereby protecting the components in the circuit 10. However, the present disclosure is not limited thereto.

Next, the details of the electronic device 1 will be described in more detail.

First, the circuit 10 will be described. In the embodiment of FIG. 1, the circuit 10 may be a step-up circuit, which further includes a diode 13 and an inductor 14.

The first switch 11 may be electrically connected to the input end Vin and the inductor 14. For example, the first switch 11 may include a first end a, a second end b and a control end c. The first end a of the first switch 11 is electrically connected to the input end Vin, the second end b of the first switch 11 is electrically connected to the inductor 14, and the control end c of the first switch 11 may be electrically connected to the second current source 12 of the circuit protection device 20 through the fourth switch 31. In one embodiment, the fourth switch 31 may include a first end g electrically connected to the control end c of the first switch 11, a second end h electrically connected to the second current source 12, and a control end i electrically connected to the detection and control unit 22. Therefore, the detection and control unit 22 may control the fourth switch 31, and the voltage of the control end c of the first switch 11 may be changed by the second current source 12 of the circuit protection device 20 so as to turn on or turn off the first switch 11. In addition, in one embodiment, the second end b of the first switch 11 may be further electrically connected to a second capacitor 15, wherein the second capacitor 15 may provide the circuit 10 with voltage stabilizing function.

One end of the inductor 14 is electrically connected to the second end b of the first switch 11, and the other end of the inductor 14 is electrically connected to one end (for example, the anode) of the diode 13 and the third switch 16. The other end (for example, the cathode) of the diode 13 may be electrically connected to the capacitor 12 and the output end Vout at a node A.

In addition, in one embodiment, when the output end Vout is electrically connected to an external component or loading, the circuit 10 may output a voltage to the external component or loading and, at this moment, the energy stored in the capacitor 12 can be provided to the external component or loading. However, the present disclosure is not limited thereto.

In one embodiment, the first switch 11, the second switch 21, the third switch 16, and/or the fourth switch 31 may be transistors, but are not limited thereto.

Accordingly, the details of the circuit 10 can be understood.

Next, the circuit protection device 20 will be described. In the embodiment of FIG. 1, the second switch 21 includes a first end d, a second end e, and a control end f. The first end d of the second switch 21 is electrically connected to the first current source I1. The second end e of the second switch 21 is electrically connected to one end (for example, the anode) of the diode 13 so as to be electrically connected to the capacitor 12 through the diode 13. The control end f of the second switch 21 is electrically connected to the detection and control unit 22, and thus the detection and control unit 22 may control the on or off state of the second switch 21.

In addition, in one embodiment, the detection and control unit 22 may control the on or off state of the fourth switch 31, and the voltage of the control end c of the first switch 11 may be changed by the second current source 12 to turn on or turn off the first switch 11. As described above, the detection and control unit 22 may also apply a voltage to the control end f of the second switch 21 to turn on or turn off the second switch 21, but the present disclosure is not limited thereto.

In one embodiment, the detection and control unit 22 may include a memory (not shown) to record the predetermined reference voltage value Vf, but it is not limited thereto. In one implementation, the detection and control unit 22 may include a control logic circuit (not shown) to implement the function of turning on the first switch 11 or the second switch 21 at a specific time point, but it is not limited thereto.

Accordingly, the details of the circuit protection device 20 can be understood.

It is noted that the types and/or quantities of the components in the embodiment of FIG. 1 are only for illustrating the functions of the present disclosure. In the practical application, the chip 2, the circuit 10, and the circuit protection device 20 may include more components.

Figure 2D:
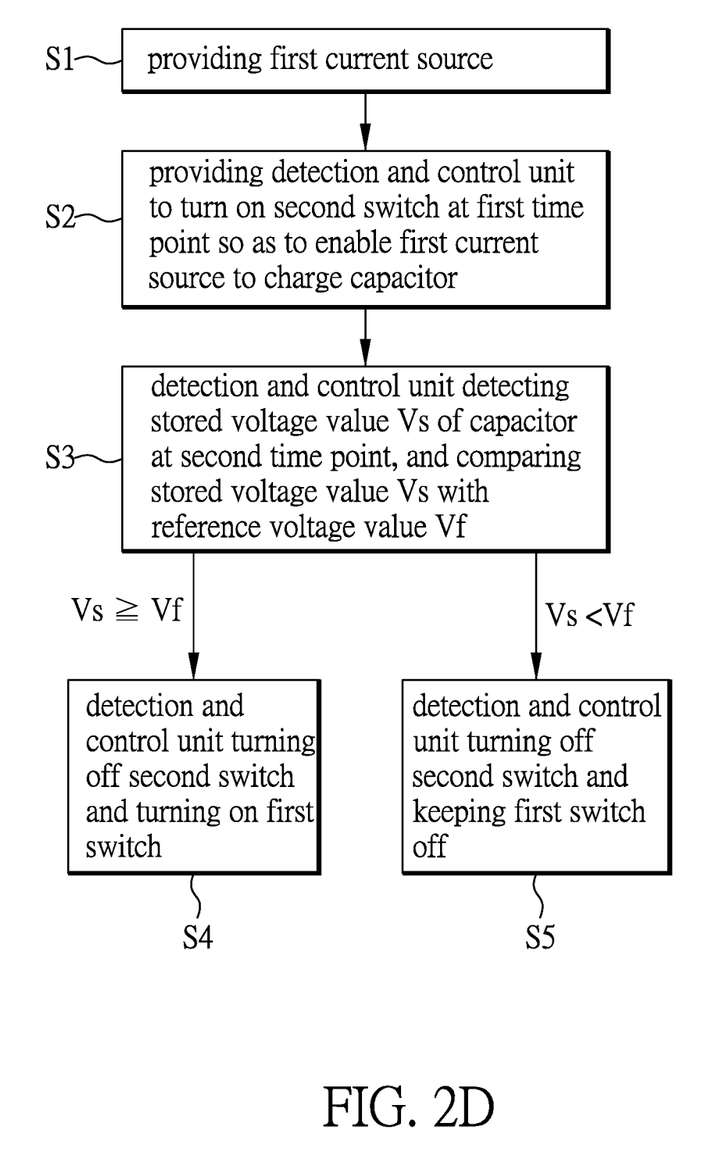
FIG. 2D is a flowchart illustrating the steps of the method circuit for protecting a circuit according to an embodiment of the present disclosure.

Next, in view of FIG. 1 and FIG. 2A to FIG. 2D, the operation process of the present disclosure will be illustrated, wherein FIG. 2D is a flowchart illustrating the steps of the method for protecting a circuit according to an embodiment of the present disclosure.

As shown in FIG. 1 and FIG. 2D, the step S1 of the method for protecting a circuit is employed to provide a first current source I1, in which the first current source I1 is electrically connected to the capacitor 12 at the node A through the second switch 21 and the diode 13. In the step S1, the detection and control unit 22 controls the first switch 11 to be in the off state, so that the current from the external voltage source cannot flow through the first switch 11.

Next, as shown in FIG. 1, FIG. 2A and FIG. 2D, the step S2 of the method for protecting a circuit is employed to provide a detection and control unit 22, which turns on the second switch 21 at the first time point t1 so as to enable the first current source I1 to charge the capacitor 12. In the step S2, the detection and control unit 22 may turn on the second switch 21, and the first current i1 provided by the first current source I1 may flow through the second switch 21 and flow to the node A through the diode 13, so as to charge the capacitor 12. As shown in FIG. 2A, the first current i1 provided by the first current source I1 may be a constant current value, but it is not limited thereto. In addition, the first switch 11 is kept in the off state.

Next, as shown in FIG. 1 and FIGS. 2A to 2D, in the step S3 of the method for protecting a circuit, the detection and control unit 22 detects the stored voltage value Vs of the capacitor 12 at the second time point t2, and compares the stored voltage value Vs with the reference voltage value Vf.

As shown in FIG. 1, FIG. 2B and FIG. 2D, if the output end Vout is not short-circuited, the first current i1 may be supplied to the capacitor 12, and thus the capacitor 12 may be charged by the first current i1 continuously supplied, so that the stored voltage value Vs gradually increases with time and is equal to the reference voltage value Vf at the time point tf. Therefore, at the second time point t2 (equal to or later than the time point tf), when the stored voltage value Vs is greater than or equal to the reference voltage value Vf (Vs≥Vf), the detection and control unit 22 may thus determine that the circuit 10 is not short-circuited. At this moment, the step S4 may be performed, in which the detection and control unit 22 may immediately turn off the second switch 21 and turn on the fourth switch 31 so as to turn on the first switch 11, such that the current entering the input end Vin may flow through the first switch 11, the inductor 14 and the diode 13 for output to the external components through the output end Vout. In one embodiment, if the stored voltage value Vs at the second time point t2 is greater than or equal to the reference voltage value Vf (Vs≥Vf), the detection and control unit 22 may not turn off the second switch 21 immediately; for example, the second switch 21 is turned off after the second time point t2 plus a predetermined time interval, but it is not limited thereto.

As shown in FIG. 1, FIG. 2B and FIG. 2D, if the output end Vout is short-circuited, at this moment, the output end Vout is equivalent to grounding, and the first current i1 will be directly outputted from the short circuit portion of the output end Vout. Therefore, the first current i1 is unable to charge the capacitor 12. In other words, the stored voltage value Vs of the capacitor 12 substantially dose not increase significantly with time (or it may increase slightly). Therefore, at the second time point t2, when the stored voltage value Vs is smaller than the reference voltage value Vf(Vs<Vf), the detection and control unit 22 mat thus determine that the circuit 10 is short-circuited. When the circuit 10 is short-circuited, if the first switch 11 is turned on to cause a large current generated in the circuit 10 to flow through the first switch 11, the inductor 14 and the diode 13, some of components in the circuit 10 may be damaged by the large current, resulting in failure or abnormality of the circuit 10. Therefore, the step S5 may be performed, in which the detection and control unit 22 turns off the second switch 21, and keeps the fourth switch 31 to be turned off so as to continuously turn off the first switch 11.

Accordingly, the operation process of the present disclosure can be understood.

Figure 3:
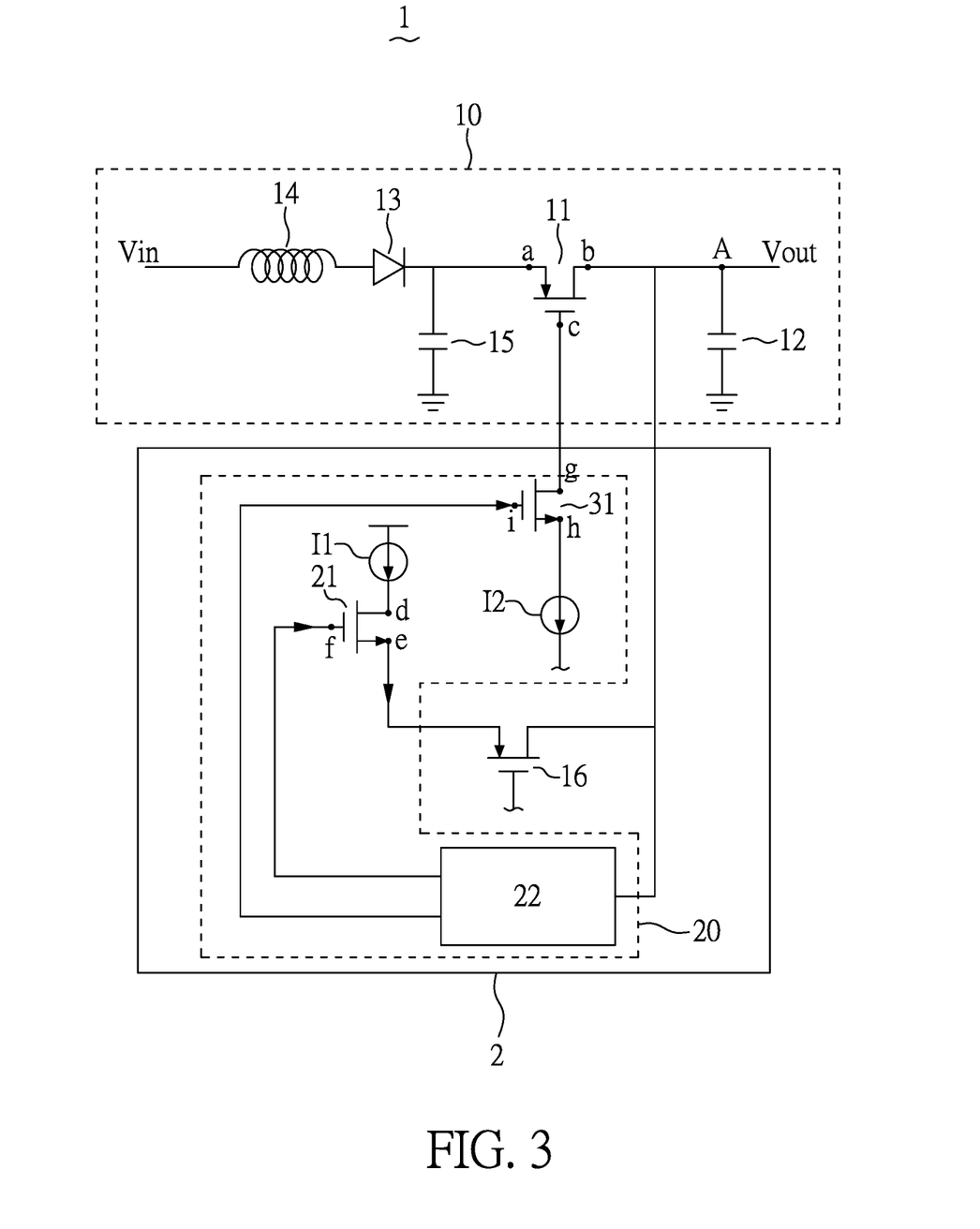
FIG. 3 is a schematic diagram of the electronic device according to another embodiment of the present disclosure.

The electronic device 1 of the present disclosure may be provided with different implementation aspects. FIG. 3 is a schematic diagram of the electronic device 1 according to another embodiment of the present disclosure, and please refer to FIG. 3 and FIGS. 1 to 2D at the same time.

The embodiment of FIG. 3 is similar to the embodiment of FIG. 1, and the components in FIG. 3 that are similar to those in FIG. 1 can be known from the description of the embodiment in FIG. 1, so that a detailed description is deemed unnecessary and only the difference therebetween is explained below.

As shown in FIG. 3, which is another embodiment of the present disclosure, the circuit 10 is also a step-up circuit, and includes an inductor 14 and a diode 13. This embodiment is different from FIG. 1 mainly in the position where the first switch 11 is arranged.

In this embodiment, the first switch 11 may be electrically connected to the diode 13 and the capacitor 12. For example, the first end a of the first switch 11 is electrically connected to the diode 13, and the second end b of the first switch 11 is electrically connected to the capacitor 12. More specifically, in this embodiment, the input end Vin is electrically connected to one end of the inductor 14; the other end of the inductor 14 is electrically connected to one end (for example, the anode) of the diode 13; the other end (for example, the cathode) of the diode 13 is electrically connected to the first end a of the first switch 11; the second end b of the first switch 11 is electrically connected to the third switch 16, the capacitor 12, and the output end Vout at the node A; the control end c of the first switch 11 may be electrically connected to the second current source 12 of the circuit protection device 20 through the fourth switch 31. As described above, the third switch 16 may be provided in the chip 2 but may also be provided in the circuit 10.

In addition, the first current source I1 is electrically connected to the capacitor 12 and the output end Vout through the second switch 21 and the third switch 16. More specifically, the first end d of the second switch 21 is electrically connected to the first current source I1; the second end e of the second switch 21 is electrically connected to the node A through the third switch 16; the control end f of the second switch 21 is electrically connected to the detection and control unit 22. Therefore, when the second switch 21 is turned on, the first current i1 (marked in FIG. 2A) provided by the first current source I1 may flow to the node A through the second switch 21 and the third switch 16 (kept in on state), so as to charge the capacitor 12.

In addition, the operation mode of this embodiment can be known from the description of FIGS. 2A to 2D, and thus a detailed description is deemed unnecessary.

Figure 4:
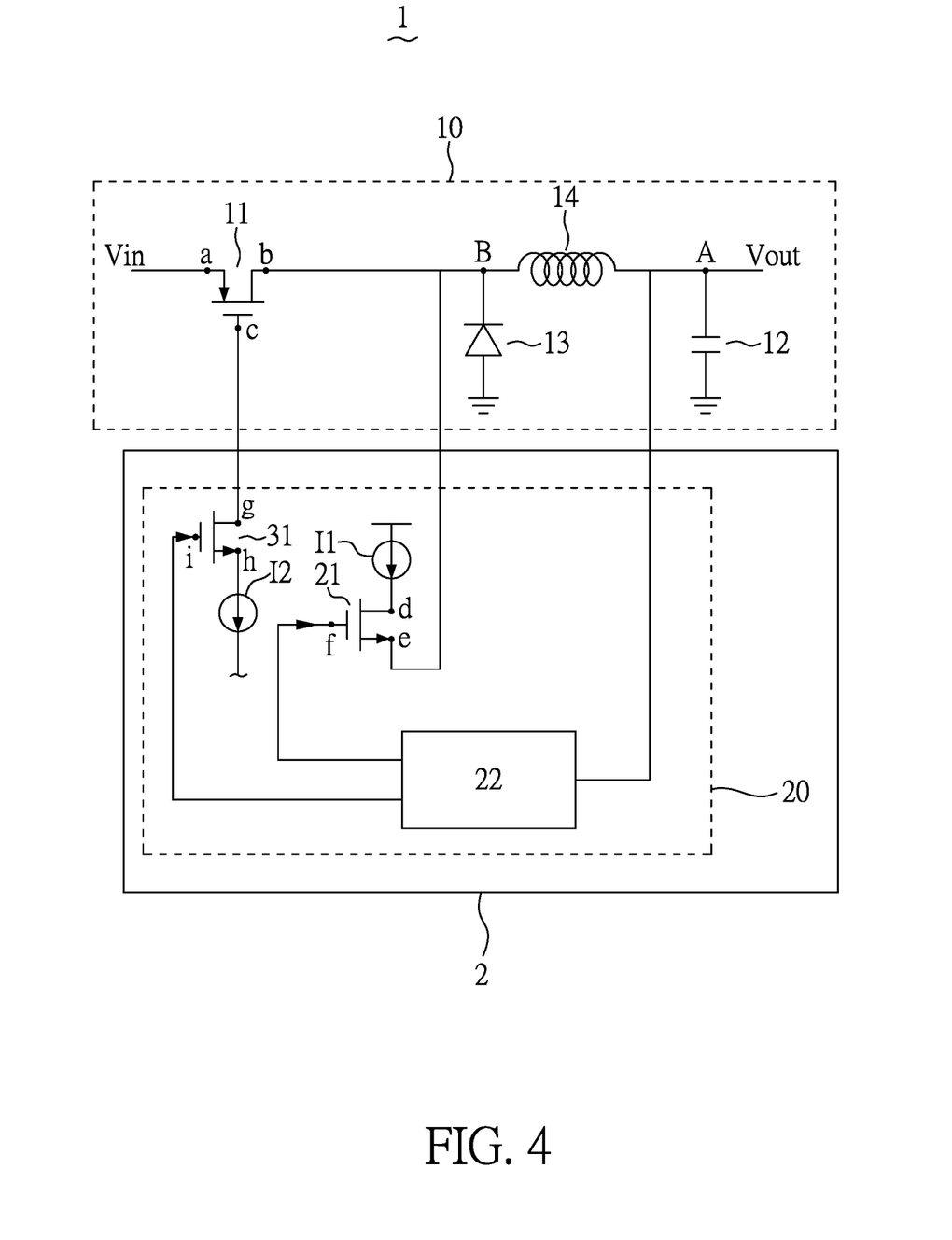
FIG. 4 is a schematic diagram of an electronic device according to still another embodiment of the present disclosure.

The electronic device 1 of the present disclosure may be also provided with different implementation aspects. FIG. 4 is a schematic diagram of the electronic device 1 according to still another embodiment of the present disclosure, and please refer to FIG. 4 and FIGS. 1 to 3 at the same time.

The embodiment of FIG. 4 is similar to the embodiment of FIG. 1, and the components in FIG. 3 that are similar to those in FIG. 1 can be known from the description of the embodiment in FIG. 1, so that a detailed description is deemed unnecessary and only the difference therebetween is explained below.

As shown in FIG. 4, which is another embodiment of the present disclosure, the circuit 10 is a step-down circuit.

In this embodiment, the first switch 11 may be electrically connected to the input end Vin and the inductor 14. More specifically, the input end Vin is electrically connected to the first end a of the first switch 11; the second end b of the first switch 11 is electrically connected to one end (for example, the cathode) of the diode 13 and one end of the inductor 14 at node B; the other end of the inductor 14 is electrically connected to the capacitor 12 and the output end Vout at node A; the control end c of the first switch 11 may be electrically connected to the second current source 12 of the circuit protection device 20 through the fourth switch 31; the other end (for example, the anode) of the diode 13 may be grounded.

In addition, the first current source I1 is electrically connected to the capacitor 12 and the output end Vout through the second switch 21. More specifically, the first end d of the second switch 21 is electrically connected to the first current source I1; the second end e of the second switch 21 is electrically connected to the node B for being electrically connected to the capacitor 12 and the output end Vout through the inductor 14; the control end f of the second switch 21 is electrically connected to the detection and control unit 22. Therefore, when the second switch 21 is turned on, the first current i1 (marked in FIG. 2A) provided by the first current source I1 may flow to the node A through the second switch 21 and the inductor 14 so as to charge the capacitor 12.

In addition, the operation mode of this embodiment can be known from the description of FIGS. 2A to 2D, and thus a detailed description is deemed unnecessary.

Figure 5:
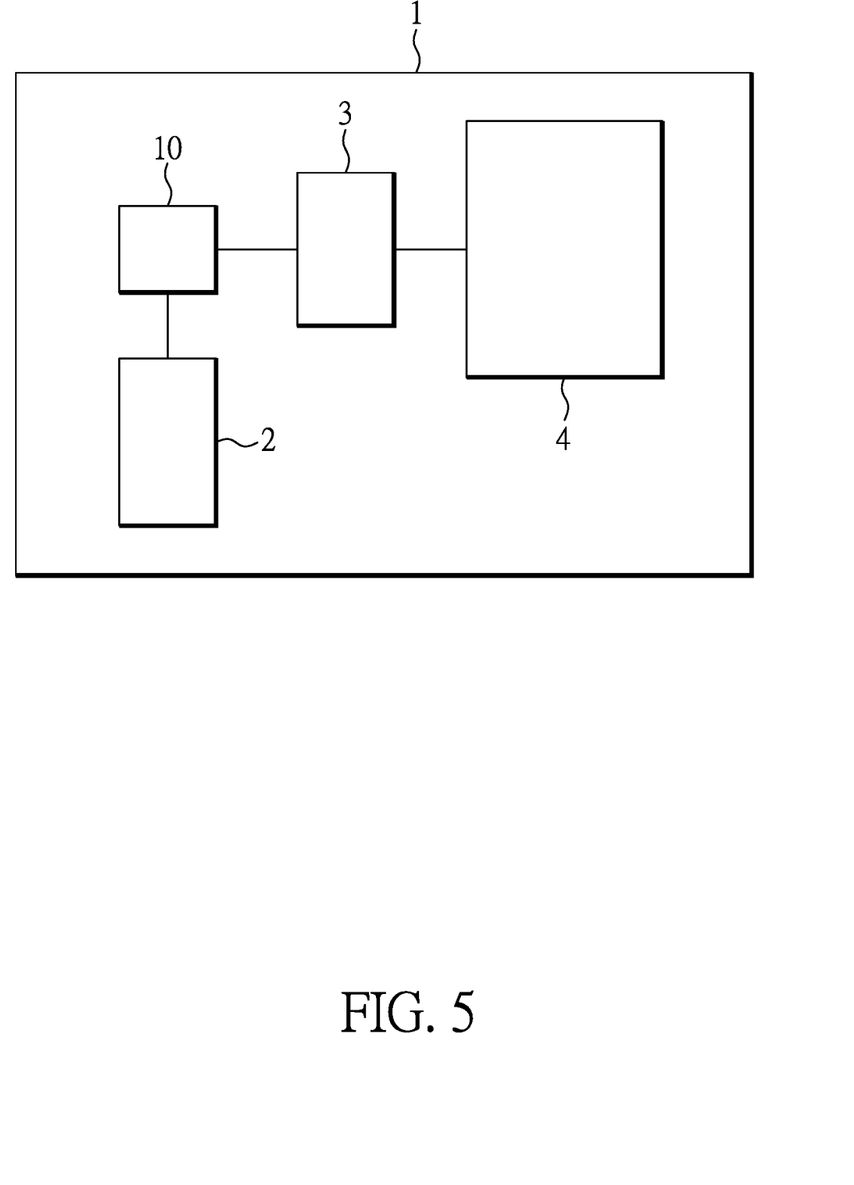
FIG. 5 is a schematic diagram illustrating an implementation of the electronic device according to an embodiment of the present disclosure.

FIG. 5 is a schematic diagram illustrating an implementation of the electronic device according to an embodiment of the present disclosure, and please refer to FIG. 5 and FIGS. 1 to 4 at the same time.

As shown in FIG. 5, the electronic device 1 may be a display device, and includes a chip 2, a circuit 10, a driving unit 3 and a display panel 4.

In this embodiment, the circuit 10 may be a step-up circuit or a step-down circuit, and a system power supply (not shown) may provide energy to the input end Vin of the circuit 10. The circuit 10 may output energy to the driving unit 3. The chip 2 may be a power management integrated circuit (PMIC) for managing the energy output of the circuit 10. After receiving the energy provided by the circuit 10, the driving unit 3 may drive the display panel 4 to enable the electronic device 1 to operate.

It is noted that the implementation aspect of the electronic device 1 is not limited to the display device.

In one embodiment, the electronic device 1 manufactured in the foregoing embodiments may be a touch device. Furthermore, if the electronic device 1 manufactured in the foregoing embodiments is a display device or a touch display device, it may be applied to any products known in the art that require a display device to display images, such as displays, mobile phones, notebook computers, camcorders, cameras, music players, mobile navigation devices, television sets, car dashboards, center consoles, electronic rearview mirrors, head-up displays, etc.

In one embodiment, the present disclosure may be used as proof of whether the object falls within the scope of patent protection at least by comparing the presence or absence of components in the electronic device 1 and the connection mode, but it is not limited thereto.

As a result, the present disclosure provides an improved method for protecting a circuit, and an improved electronic device, which can detect in advance whether the output end of the circuit is short-circuited, and then determine whether to turn on the first switch, so as to reduce the possibility of damage to the components in the circuit.

The features of the embodiments disclosed in the present disclosure may be mixed and matched arbitrarily as long as they do not violate the spirit of the invention or conflict with each other.

The aforementioned specific embodiments should be construed as merely illustrative, and not limiting the rest of the present disclosure in any way.

What is claimed is:

1. A method for protecting a circuit including an input end, a first switch, and a capacitor electrically connected to the input end through the first switch, comprising:
   providing a first current source electrically connected to the capacitor through a second switch;
   providing a detection and control unit to turn on the second switch at a first time point so as to enable the first current source to charge the capacitor; and
   using the detection and control unit to detect a stored voltage value of the capacitor at a second time point, and compare the stored voltage value with a reference voltage value,
   wherein, the circuit further includes a diode and an inductor, and the first switch is electrically connected to the input end and the inductor, when the stored voltage value is greater than or equal to the reference voltage value, the detection and control unit turns off the second switch and turns on the first switch and, when the stored voltage value is smaller than the reference voltage value, the detection and control unit turns off the second switch and keeps the first switch off.

2. The method of claim 1, wherein the circuit is a step-up circuit.

3. The method of claim 2, wherein the circuit further includes a diode and an inductor, and the first switch is electrically connected to the diode and the capacitor.

4. The method of claim 1, wherein the circuit is a step-down circuit.

5. The method of claim 4, wherein the circuit further includes a diode and an inductor, and the first switch is electrically connected to the input end and the inductor.

6. The method of claim 1, wherein the second time point is later than the first time point.

7. An electronic device, comprising:
   a circuit including an input end, a first switch, a diode, an inductor and a capacitor, wherein the capacitor is electrically connected to the input end through the first switch and the first switch is electrically connected to the input end and the inductor; and
   a circuit protection device, including:
   a second switch;
   a first current source electrically connected to the capacitor through the second switch; and
   a detection and control unit, which turns on the second switch at a first time point so that the first current source charges the capacitor, detects a stored voltage value of the capacitor at a second time point, and compares the stored voltage value with a reference voltage value,
   wherein, when the storage voltage value is greater than or equal to the reference voltage value, the detection and control unit turns off the second switch and turns on the first switch and, when the stored voltage value is smaller than the reference voltage value, the detection and control unit turns off the second switch and keeps the first switch off.

8. The electronic device of claim 7, wherein the circuit is a step-up circuit.

9. The electronic device of claim 8, wherein the first switch has a first end electrically connected to the input end, a second end electrically connected to the inductor, and a control end.

10. The electronic device of claim 9, wherein the second switch has a first end electrically connected to the first current source, a second end electrically connected to the diode, and a control end electrically connected to the detection and control unit.

11. The electronic device of claim 10, wherein the circuit protection device further includes: a fourth switch having a first end connected to the control end of the first switch, a second end, and a control end electrically connected to the detection and control unit; and a second current source electrically connected to the second end of the fourth switch.

12. The electronic device as claimed in claim 7, wherein the circuit is a boost circuit and comprises a diode and an inductor, wherein the first switch is electrically connected to the diode and the capacitor.

13. The electronic device of claim 12, wherein the first switch has a first end electrically connected to the diode, a second end electrically connected to the capacitor, and a control end.

14. The electronic device of claim 13, wherein the second switch has a first end electrically connected to the first current source, a second end electrically connected to the second end of the first switch through a third switch, and a control end electrically connected to the detection and control unit.

15. The electronic device of claim 14, wherein the circuit protection device further includes: a fourth switch having a first end connected to the control end of the first switch, a second end, and a control end electrically connected to the detection and control unit; and a second current source electrically connected to the second end of the fourth switch.

16. The electronic device of claim 7, wherein the circuit is a step-down circuit and includes a diode and an inductor, wherein the first switch is electrically connected to the input end and the inductor.

17. The electronic device of claim 16, wherein the first switch has a first end electrically connected to the input end, a second end electrically connected to the diode, and a control end.

18. The electronic device of claim 17, wherein the second switch has a first end electrically connected to the first current source, a second end electrically connected to the second end of the first switch, and a control end electrically connected to the detection and control unit.

19. The electronic device of claim 18, wherein the circuit protection device further includes: a fourth switch having a first end connected to the control end of the first switch, a second end, and a control end electrically connected to the detection and control unit; and a second current source electrically connected to the second end of the fourth switch.

* * * * *